(12) United States Patent
Matsuda et al.

(10) Patent No.: US 6,820,005 B2
(45) Date of Patent: *Nov. 16, 2004

(54) ROUTE GUIDANCE APPARATUS AND METHOD

(75) Inventors: Mieko Matsuda, Kanagawa-ken (JP); Tamotsu Hasegawa, Tokyo (JP); Hiroaki Kubota, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/704,692

(22) Filed: Nov. 12, 2003

(65) Prior Publication Data

US 2004/0098192 A1 May 20, 2004

Related U.S. Application Data

(63) Continuation of application No. 10/379,689, filed on Mar. 6, 2003, now Pat. No. 6,718,262, which is a continuation of application No. 10/083,367, filed on Feb. 27, 2002, now Pat. No. 6,594,581.

(30) Foreign Application Priority Data

Feb. 28, 2001 (JP) .................................. PH2001-055846

(51) Int. Cl.[7] .............................................. G01C 21/34
(52) U.S. Cl. .................. 701/211; 701/201; 340/995.19
(58) Field of Search ................. 701/211, 201, 701/208, 209, 213; 340/995.11, 990

(56) References Cited

U.S. PATENT DOCUMENTS

| | | | |
|---|---|---|---|
| 5,121,326 A | | 6/1992 | Moroto et al. |
| 6,119,065 A | * | 9/2000 | Shimada et al. ............ 701/201 |
| 6,144,318 A | * | 11/2000 | Hayashi et al. ........ 340/995.19 |
| 6,184,823 B1 | | 2/2001 | Smith et al. |
| 6,339,746 B1 | | 1/2002 | Sugiyama et al. |
| 6,510,379 B1 | | 1/2003 | Hasegawa et al. |
| 6,594,581 B2 | | 7/2003 | Matsuda et al. |

OTHER PUBLICATIONS

Hasegawa et al., "Text Generating Method for Interactive Route Guidance Service for Pedestrian," Technical Report of IEICE (Jul. 2001), HIP 2001–13, pp. 43–48.

Kubota et al., "Route Guidance Generating Methods for Cellular Phone," 12th Annual Symposium on Information System of Vector Graphics (May 2001), IEICE, pp. 53–58.

Kubota et al., "A Route Guide Text Generating Using Crossing Pattern Analysis for a Pedestrian Navigation," 63rd National Convention of IPSJ (Mar. 2001), 3J7.

Kimura et al., "Modeling of Geographic Road Structure for Generation of Map Image and Linguistic Guide," Technical Report of IEICE (Jan. 1997), pp. 113–120.

Horie et al., "Interactive Generation of a Route and its Application to Generating a Sketch Map Drawing in a Map Image Information System," Technical Report of IEICE (Feb. 1996), pp. 31–38.

* cited by examiner

Primary Examiner—Marthe Y. Marc-Coleman
(74) Attorney, Agent, or Firm—Finnegan, Henderson, Farabow, Garrett & Dunner, L.L.P.

(57) ABSTRACT

A database stores map data including road network data and landmark data. A route search unit searches for a route from a departure point to a destination point from the road network data stored in said database. A road pattern analysis unit analyzes a road pattern of the route by referring to the road network data, and obtains road pattern data as the analysis result. A route guidance information generation unit generates route guidance information of the route using the road pattern data and the landmark data along the route. A presentation unit presents the route guidance information.

3 Claims, 23 Drawing Sheets

| ID | NUMERICAL |
|---|---|
| POSITION | (X, Y) |
| NAME | CHARACTER SEQUENCE |
| THE NUMBER OF ARKS TO BE CONNECTED | NUMERICAL VALUE |
| ARRANGEMENT OF ARK ID TO BE CONNECTED | ARRANGEMENT OF NUMERICAL VALUE |

FIG.4A

| ID | NUMERICAL VALUE |
|---|---|
| POSITION OF STARTING POINT | $(X_0, Y_0)$ |
| POSITION OF END POINT | $(X_1, Y_1)$ |
| NAME | CHARACTER SEQUENCE |
| ROAD WIDTH | NUMERICAL VALUE |

FIG.4B

| ROAD | | EXPRESSION OF ROUTE GUIDANCE | ANGLE (°) OF EACH ROAD | | | PRESENTATION PATTERN | |
|---|---|---|---|---|---|---|---|
| | | | ANGLE DIFFERENCE FOR ENTERING DIRECTION | | | BIT MAP DATA | VECTOR DATA |
| NUMBER | PATTERN | | $\theta_0$ | $\theta_1$ | $\theta_2$ | | |
| 2 | NON-JUNCTION | FOLLOW A ROAD | 0~45 | | | BMP 1 | VP 1 |
| | | RIGHT-TURN | 45~135 | | | BMP 2 | VP 2 |
| | | LEFT-TURN | 225~135 | | | • | • |
| 3 | JUNCTION (FORKED ROAD) | T-CROSSING or THE END | 70~110 | 250~290 | | • | • |
| | | Y-CROSSING | 30~70 | 290~330 | | • | • |
| 4 | JUNCTION (THREE-FORKED ROAD) | GO STRAIGHT, CROSS THE ROAD | 340~360 0~20 | 70~110 | 250~290 | • | • |
| | | TURN TO THE RIGHT AT THE JUNCTION | 70~110 | 340~360 0~20 | 250~290 | • | • |
| | | TURN TO THE LEFT AT THE JUNCTION | 250~290 | 70~110 | 340~360 0~20 | • | • |

($\theta_0, \theta_1, \theta_2$ : ANGLE DIFFERENCE BETWEEN AN EXTENSION OF ENTERING ROAD AND EACH ROAD IN A CLOCKWISE DIRECTION)

FIG.8 n=3

$\theta_L = \theta_R = 45°$

JUNCTION PATTERN : Y-CROSSING n=3

$\theta_L = \theta_R = 90°$

JUNCTION PATTERN : T-CROSSING

| ID | NUMERICAL VALUE |
|---|---|
| NAME | CHARACTER SEQUENCE |
| CLASS | NUMERICAL VALUE |
| PRIORITY DEGREE | NUMERICAL VALUE |
| POSITION | (X, Y)( LATITUDE, LONGITUDE) |

FIG.12

GO STRAIGHT AT
THE JUNCTION

TURN TO THE LEFT
AT T-CROSSING

GO FORWARD TO THE
RIGHT AT Y-CROSSING

GO STRAIGHT

① GO FORWARD.TO THE NORTH FROM THE DEPARTURE POINT.

② TURN TO THE LEFT AT THE END.

③ GO FORWARD BY 130 METERS FROM ○○ GAS STATION.

④ TURN TO THE RIGHT AT THE CORNER OF JUNCTION NEIGHBORING THE CONVENIENCE STORE, AND GO FORWARD BY 100 METERS.

⑤ ○○ POST OFFICE AS THE DESTINATION IS LOCATED AT THE RIGHT SIDE ★.

FIG.16

GO STRAIGHT AT
THE JUNCTION

TURN TO THE LEFT AT
T-CROSSING

GO FORWARD TO THE
RIGHT AT Y-CROSSING

GO STRAIGHT

ROUTE GUIDANCE APPARATUS AND METHOD

CROSS-REFERENCE TO RELATED APPLICATIONS

This is a continuation of application Ser. No. 10/379,689, filed Mar. 6, 2003, now U.S. Pat. No. 6,718,262 which is a continuation of application Ser. No. 10/083,367, filed Feb. 27, 2002, now U.S. Pat. No. 6,594,581, and claims the benefit of priority to Japanese Patent Application No. PH2001-055846, filed Feb. 28, 2001, all of which are incorporated herein by reference.

This application is based upon and claims the benefit of priority from the prior Japanese Patent Application PH2001-055846, filed on Feb. 28, 2001; the entire contents of which are incorporated herein by reference.

FIELD OF THE INVENTION

The present invention relates to a route guidance apparatus and a method for executing route guidance for a pedestrian by presenting a route guidance sentence or a simplified map.

BACKGROUND OF THE INVENTION

Recently, a route guidance apparatus for presenting a route guidance sentence and a simplified map to a destination for a pedestrian is developed. This route guidance apparatus is a simple portable device or is loaded to a portable communication terminal such as a cellular-phone or a personal data assistant (PDA).

A route guidance technique using the route guidance sentence and the simplified map is disclosed in the following two references.

(1) TECHNICAL REPORT OF IEICE, PRU95-215 (1996–02), "Interactive Generation of a Route and Its Application to Generating a Sketch Map Drawing in a Map Image Information System" Masahiko HORIE, Toshihiro KIMURA, Noboru BABAGUCHI, Seiichiro DAN and Tadahiro KITAHASHI (2) TECHNICAL REPORT OF IEICE, PRMU96–156 (1997–01), "Modeling of Geographic Road Structure for Generation of Sketch Map Image and Linguistic Guide" Toshihiro KIMURA, Yoshihiro SUZUKI, Seiichiro DAN, Noboru BABAGUCHI and Tadahiro KITAHASHI As for generation of the route guidance sentence, in reference (1), for example, a sentence "Please go forward to the west direction by 20 meters." and "Please turn to the right at the junction." can be presented. However, especially, numerical value representing distance such as " meters" is difficult for a pedestrian to apply. Furthermore, innumerable junctions exist in a town area, and the pedestrian often mistakes a junction indicated by the route guidance sentence for another junction. Accordingly, such route guidance sentence is not always easy for the pedestrian to sufficiently understand. In reference (2), for example, a route guidance sentence such as "This road joins another road." or "You advance to  at a crossroads." is only presented. This route guidance sentence is more difficult for the pedestrian to understand than the route guidance sentence disclosed in the reference (1).

As mentioned-above, in the known route guidance technique, presentation of the route guidance sentence is not always easy for the pedestrian to understand, and it is often possible for the pedestrian to misunderstand a junction point, a joint point, or a divergence point indicated by the route guidance sentence.

SUMMARY OF THE INVENTION

It is an object of the present invention to provide a route guidance apparatus and a method to present route guidance easy for the pedestrian to understand.

According to the present invention, there is provided a pedestrian route guidance apparatus, comprising: a database configured to store map data including road network data and landmark data; a route search unit configured to search for a route from a departure point to a destination point from the road network data stored in said database; a road pattern analysis unit configured to analyze a road pattern of the route by referring to the road network data, and to obtain road pattern data as the analysis result; a route guidance information generation unit configured to generate route guidance information of the route using the road pattern data and the landmark data along the route; and a presentation unit configured to present the route guidance information.

Further in accordance with the present invention, there is also provided a pedestrian route guidance method, comprising: storing map data including road network data and landmark data in a database; searching for a route from a departure point to a destination point from the road network data stored in the database; analyzing a road pattern of the route by referring to the road network data; obtaining road pattern data as the analysis result; generating route guidance information of the route using the road pattern data and the landmark data along the route; and presenting the route guidance information.

Further in accordance with the present invention, there is also provided a computer program product, comprising: a computer readable program code embodied in said product for causing a computer to execute pedestrian route guidance, said computer readable program code having: a first program code to store map data including road network data and landmark data in a database; a second program code to search for a route from a departure point to a destination point from the road network data stored in the database; a third program code to analyze a road pattern of the route by referring to the road network data; a fourth program code to obtain road pattern data as the analysis result; a fifth program code to generate route guidance information of the route using the road pattern data and the landmark data along the route; and a sixth program code to present the route guidance information.

BRIEF DESCRIPTION OF THE DRAWINGS

FIGS. 4A and 4B are schematic diagrams of component example of node data and arc data.

FIG. 8 is a schematic diagram of one example of a decision dictionary to decide a road pattern and an expression of route guidance.

FIG. 12 is a schematic diagram of component example of landmark data.

FIG. 16 is a schematic diagram of one example of route guidance sentences.

DETAILED DESCRIPTION OF THE EMBODIMENTS

Figure 1:
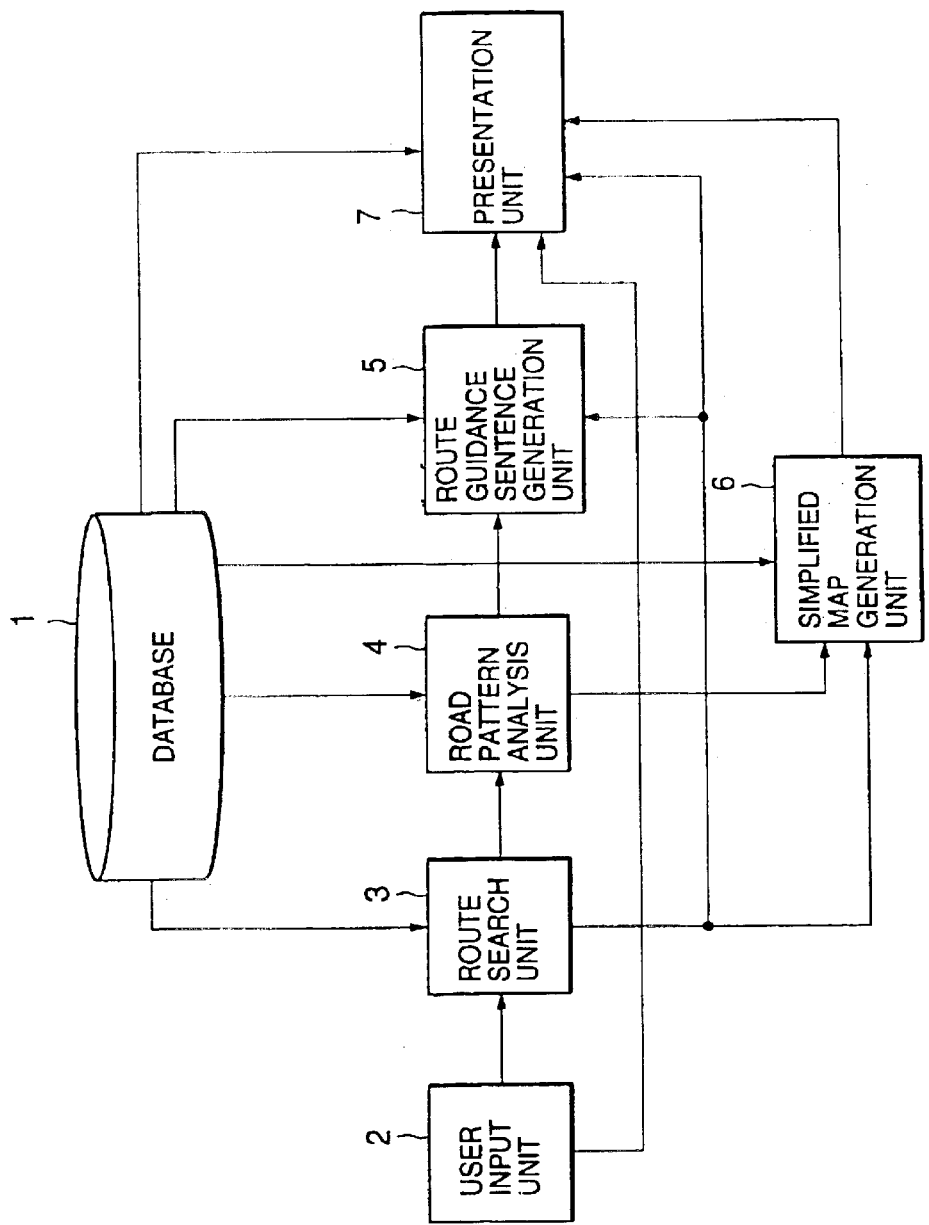
FIG. 1 is a block diagram of the route guidance apparatus according to one embodiment of the present invention.

Hereinafter, various embodiments of the present invention will be explained by referring to the drawings. FIG. 1 is a block diagram of a pedestrian route guidance apparatus according to one embodiment of the present invention. The pedestrian guidance apparatus and method is preferably optimized for the relative slow speed of a pedestrian, as opposed to a motor vehicle, as well as for the free movement of a pedestrian unrestrained by motor vehicle restrictions such as turn lanes and one-way road. Thus "pedestrian" is not strictly limited to a person who travels by foot, but also applies to similar transportation modes such as skate boards, scooters, wheelchairs, in-line skates, and even bicycle.

In a database 1, basic data to generate a route guidance sentence and a simplified map along a route such as map data, a route guidance sentence database used for generation of the route guidance sentence, and a simplified map database are stored. In the map data, in addition to map image, road network data and landmark data are included. In the route guidance sentence database and the simplified map database, a plurality of presentation patterns corresponding to each road pattern are included. Furthermore, in the simplified map database, the presentation is stored as bit map data or vector data.

The database 1 may be set in the route guidance apparatus. However, if function of the route guidance apparatus is packaged in a portable communication terminal such as a cellular-phone, or if the route guidance apparatus is composed as a dedicated portable device, the database 1 is set outside the route guidance apparatus and connected to the route guidance apparatus by wireless communication.

Furthermore, in the database 1, the map data and the landmark data may be an outside database set outside the route guidance apparatus, and the route guidance sentence database and the simplified map database may be an inside database set in the route guidance apparatus.

A user input unit 2 is used for various kinds of input operation such as key operation or dial operation by a user using the route guidance apparatus (i.e., a pedestrian). When the user inputs location information of a departure place and a destination through the input unit 2, road network data is read from the database 1 based on the location information, and supplied to a rout search unit 3.

The route search unit 3 searches for a route from the departure place to the destination using the location information input by the user input unit 2 and the road network data read from the database 1, and generates route data represented by vector data.

A road pattern analysis unit 4 analyzes a road pattern of the route (pattern analysis) by referring to the road network data corresponding to the route data in the database 1. In this case, the road pattern is a pattern of road included in the route and neighboring area of the route, which is explained in detail afterward. For example, the road pattern includes type (road attribute) representing whether the road is a straight route, whether the road is a junction point or a corner (crank, S curve), or whether the road is a station rotary. In addition to this, if the road is a junction point or a corner, the road pattern represents detail pattern. An analysis method of the road pattern is explained below.

In a route guidance sentence generation unit 5 and a simplified map generation unit 6, by using the road pattern data from the road pattern analysis unit 4, the landmark data corresponding to the road pattern data from the database 1, and the route guidance sentence and the simplified map database from the database 1, the route guidance sentence and the simplified map are generated as route guidance information to guide a user along the route from the route search unit 3.

A presentation unit 7 is, for example, a display or a speaker. In the presentation unit 7, based on the route guidance sentence data from the route guidance sentence generation unit 5, a route guidance sentence is presented by character sequence or speech. Furthermore, based on the simplified map data from the simplified map generation unit 6, a simplified map along a route from the departure place to the destination is displayed as an image. In this way, the route guidance sentence and the simplified map are presented to the user.

In the above-mentioned component element in the route guidance apparatus in FIG. 1, a part of the database 1, the route search unit 3, the road pattern analysis unit 4, the route guidance sentence generation unit 5, and the simplified map generation unit 6 can be realized as software processing by a computer such as a rout guidance apparatus terminal or a portable communication terminal.

Figure 2:
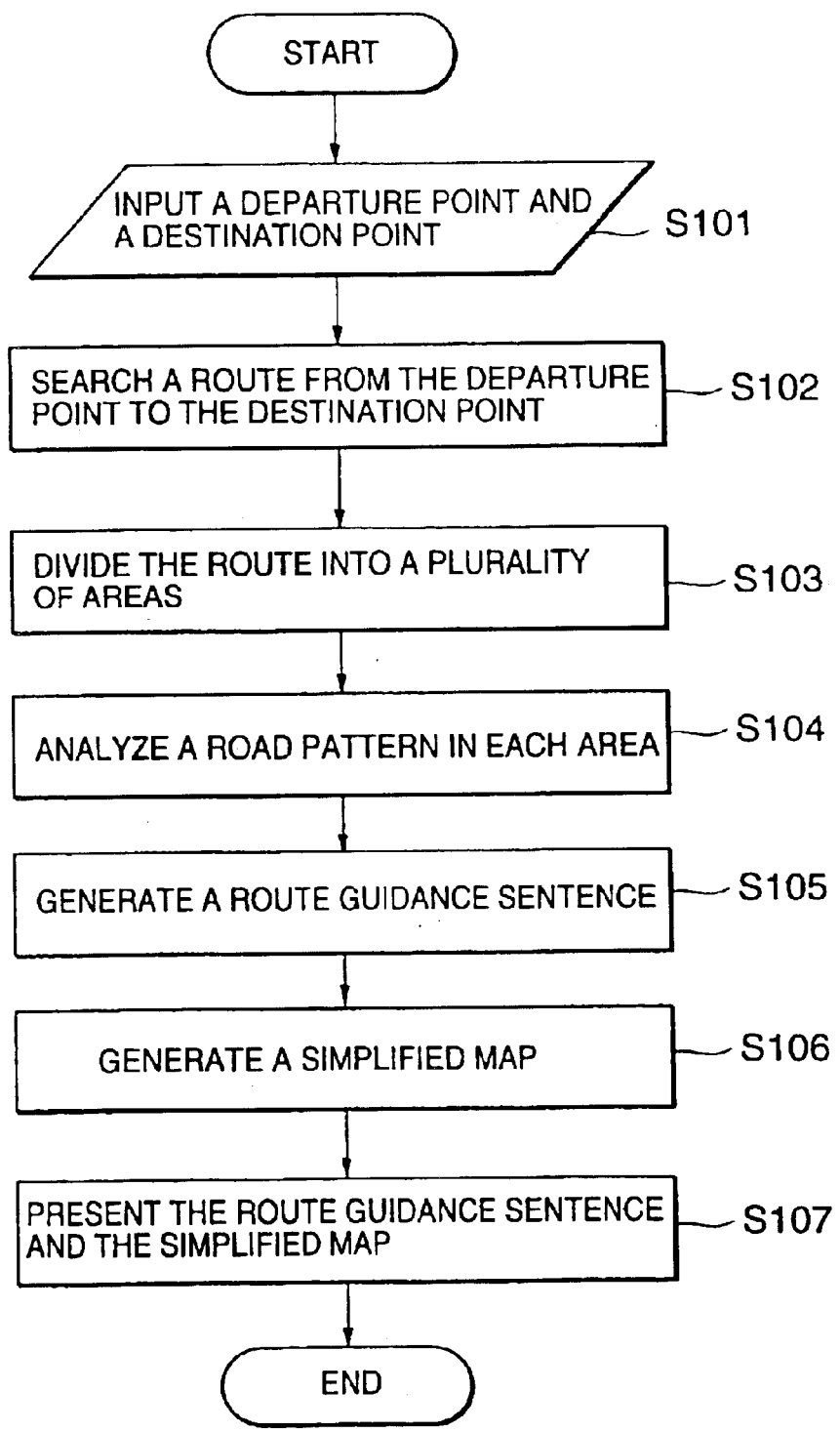
FIG. 2 is a flow chart of route guidance processing according to one embodiment of the present invention.

Next, by following a flow chart shown in FIG. 2, the route guidance processing of the present embodiment is explained. First, the user input unit 2 is operated by a user who desires the route guidance, and a departure point and a destination point are input (S101). As this input operation, in a condition that a map of place including a departure place and a destination is displayed based on the map data from the database 1 on a screen of the route guidance apparatus (a display of the presentation unit 7), the user may indicate the departure point and the destination point on the map by using a mouse, a cursor, a pen, or a key. Furthermore, the user may select the departure place and the destination from a list including landmarks, addresses, and names.

Next, based on the departure point and the destination point input by the user, and a route search condition, the route search unit 3 searches for a route from the departure point to the destination point (S102). As a route search method, a route including a sidewalk may be preferably selected. Furthermore, Dijkstra's method well known as an algorithm to find the shortest route may be used. Of course, other methods of route search can be used. Briefly, it is sufficient that some route connected from the departure place to the destination can be determined. Otherwise, the user may directly input the route on the map.

Figure 3:
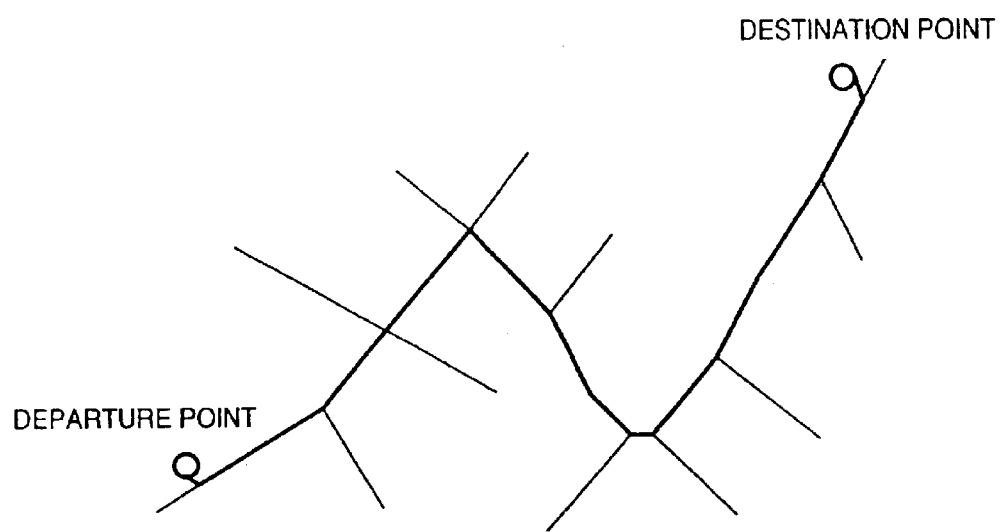
FIG. 3 is a schematic diagram of one example of a route to be searched.

As a result of the route search, as shown in FIG. 3, route data from the departure point to the destination point represented by node and arc are obtained. For example, the node is represented as node data shown in FIG. 4A and the arc is represented as arc data shown in FIG. 4B. The node is a divergence point on the road network, for example, the node exists in a junction point and a corner. The arc is a line segment connecting two nodes. If a plurality of arcs are connected to one node, the plurality of arcs can be extracted by referring to connection from the node. Furthermore, by tracing from arc to node and from node to arc in order, a series of route lines can be traced.

Figure 5:
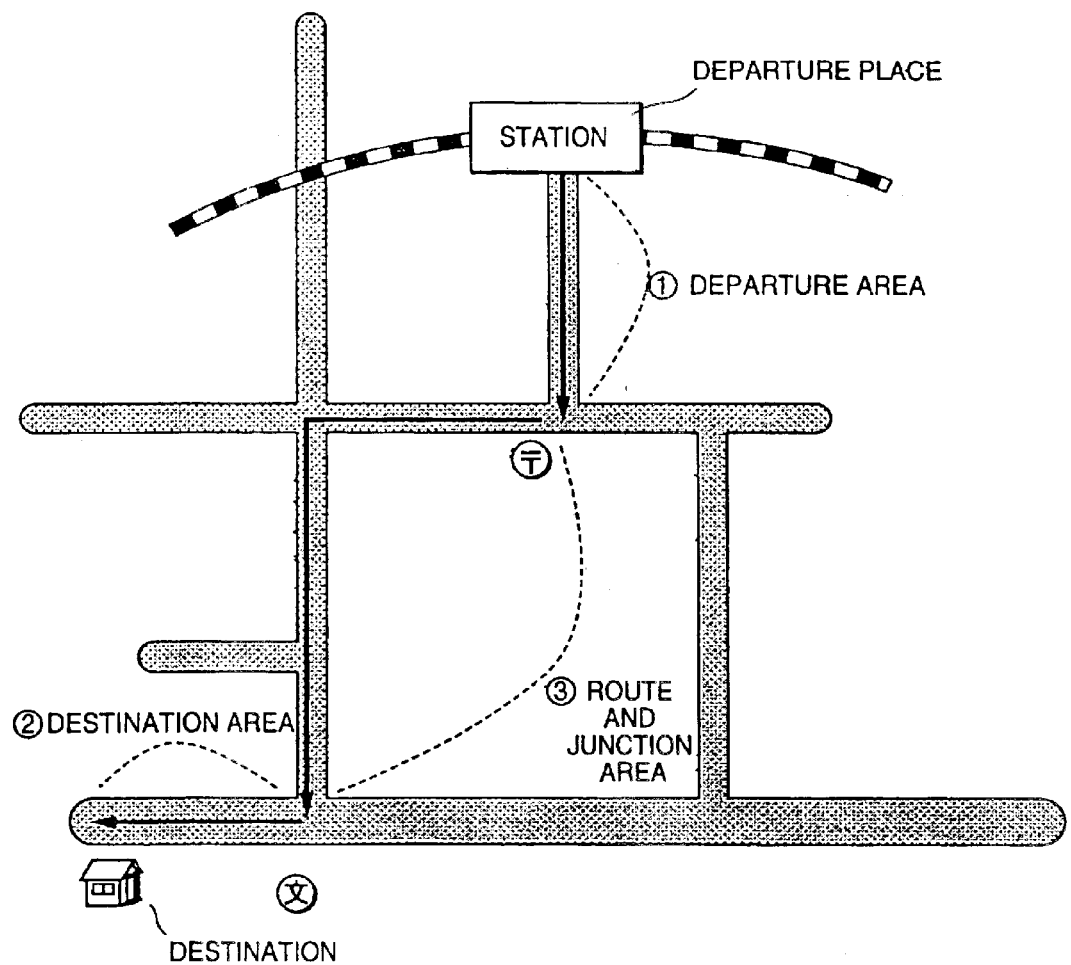
FIG. 5 is a schematic diagram of one example of divided route.

Next, in the present embodiment, as shown in FIG. 5, the route search unit 3 divides the route searched at S102 into at least three areas, i.e., a departure area, a destination area, and an intermediate area (route and junction area) (S103). Briefly, the route is divided into three class parts used for generation of the route guidance sentence and presentation of the simplified map. By referring to FIG. 5, one example of route division processing is explained.

The departure area is an area from the departure place input by the user to the first target object. In FIG. 5, the departure place is a station. When the user walks from the station to the destination, a target object first watched by the user is a post office. The departure area is thus the area from the station to the post office. The departure area is important for a pedestrian to decide a direction to begin walking. The departure area does not always include a road. Accordingly, special explanation is sometimes necessary for the route guidance sentence or the simplified map.

The destination area is an area from the last target object to the destination input by the user. In FIG. 5, the object last appearing along the route is a school. The destination area is thus the area from the school to the destination. The road network does not always include a distinction at a place of a pedestrian's target. Accordingly, special explanation is sometimes necessary for the map, the route guidance sentence, or the simplified map from the last target object to the destination.

In addition to the example post office and school, the target object may be a signpost building such as a bank, a cinema theater, an eating house, a supermarket and a convenience store, a signal, a junction name, a road name, road pattern such as a T-crossing or a junction, attendant object to the road such as a pedestrian bridge and marked crosswalk. In short, the target object is an object usable as the signpost for the pedestrian's walking. The route search unit 3 obtains information of the target object by referring to the road network data and the landmark data in the database 1. Furthermore, the route and junction area is a road included in intermediate route except for the departure place and the destination. The route and junction area includes a junction, a corner, and so on. In the present embodiment, the road pattern analysis is mainly executed for the route and junction area.

Next, the road pattern analysis unit 4 analyzes a road pattern of the route searched at S102 (S104). If route division processing of S103 is executed after route search of S102, as mentioned-above, the road pattern of the route and junction area is analyzed at S104. The road pattern is mainly a pattern of intersection. The road pattern analysis represents which forked road the junction is, which degree the angle difference between a direction of entering road and a direction of escape road at the junction, whether the road crosses a wide road at the junction, whether the road crosses an overpass. In short, the road pattern unable to be analyzed based on the road network data is analyzed.

Next, by referring to the road pattern data obtained at S104, the landmark data stored in the database 1, and the route guidance sentence database stored in the database 1, the route guidance sentence generation unit 5 generates a route guidance sentence including explanation of road pattern and landmark name to guide a user along the route determined at S102.

Furthermore, by referring to the road pattern data obtained at S102, the target object used for the route guidance, information obtained by route pattern analysis unit 4, and the map database stored in the database 1, the simplified map generation unit 6 generates a simplified map (S106).

Then, the presentation unit 7 presents the route guidance sentence generated at S105 by display of character sequence or speech. Furthermore, the presentation unit 7 presents the simplified map generated at S106 by image display (S107).

Figure 6A:
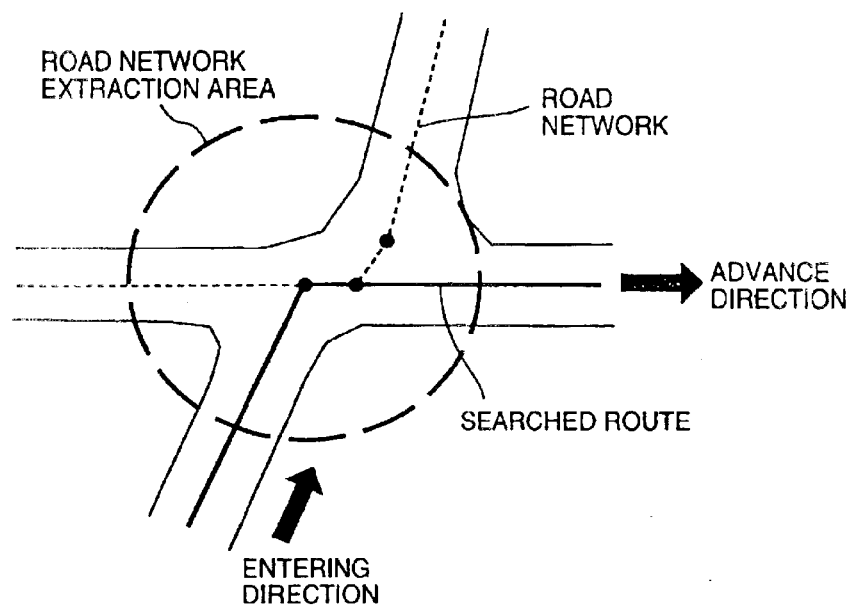
FIGS. 6A and 6B are schematic diagrams of road network data neighboring a junction point and analysis result of junction pattern.
Figure 6B:
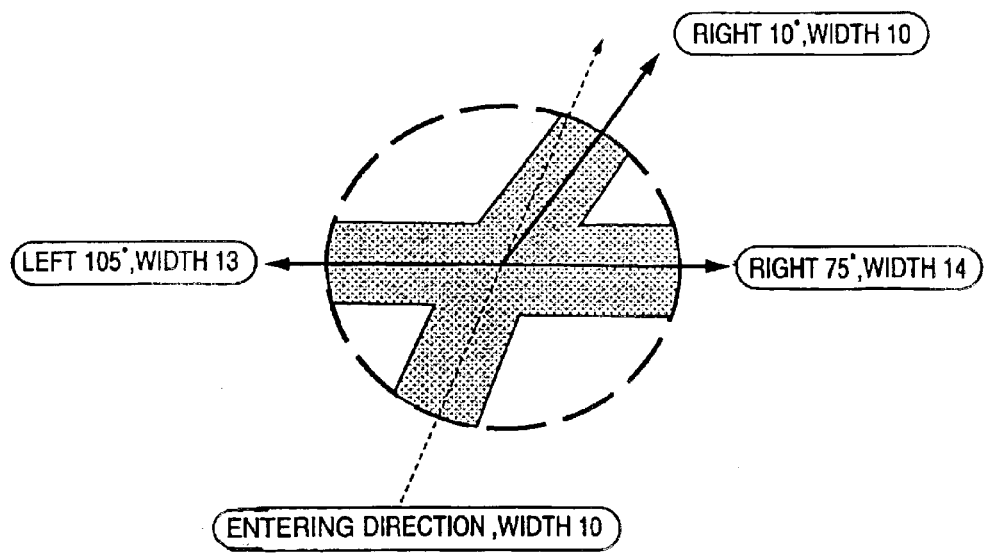

Hereinafter, processing of each step in FIG. 2 is explained in detail. First, as a concrete example of analysis processing at S104 by the road pattern analysis unit 4, analysis processing of junction pattern is explained. The road pattern analysis unit 4 extracts road network data of the route searched by the route search unit 3 from the database 1. For example, as shown in FIG. 6A, the road pattern analysis unit 4 sets a mask having a size several times the road width of advance direction on road network area and having a center point at the junction, and extracts the road network data included in the mask from the database 1. Next, the road pattern analysis unit 4 analyzes the road network area in the area extracted by the mask (road network extraction area). As shown in FIG. 6B, the road pattern analysis unit 4 measures the number n (In FIG. 6B, n=4) of route lines each extended from the junction to outside of the road network extraction area, a direction of each route line (angle difference between entering direction and each direction), and a width of each route. By this road pattern analysis, the object junction is decided to be "three-forked road", "T-crossing and the end", "Y-crossing and forked road".

Figure 7:
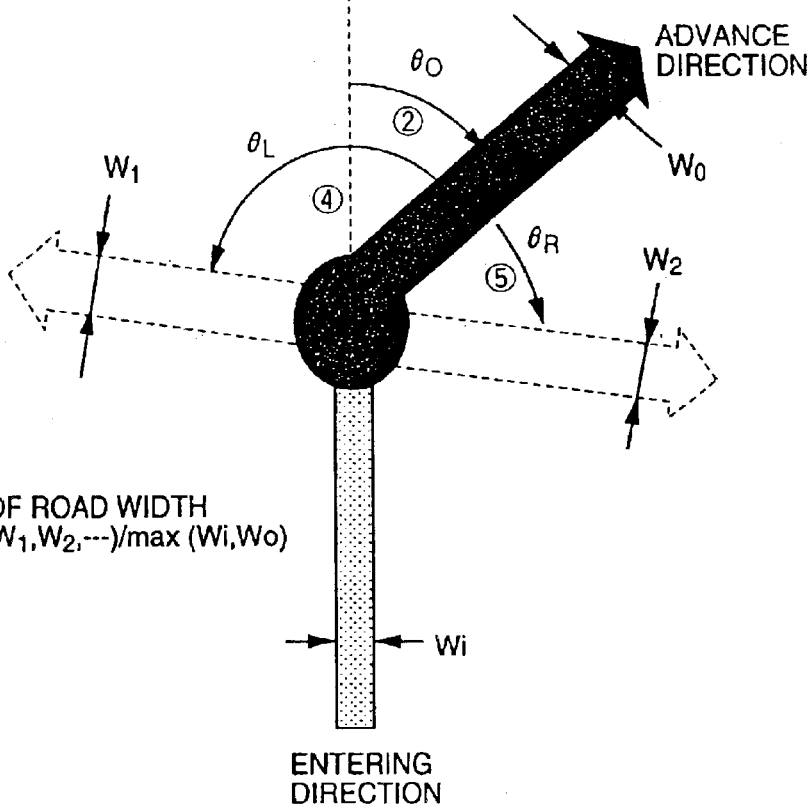
FIG. 7 is a schematic diagram of various parameters representing a junction pattern.

In case that the road pattern analysis unit 4 analyzes a junction pattern, the road pattern analysis unit 4 analyzes the road network data in the road network extraction area, and generates the following seven parameters of junction pattern as shown in FIG. 7.

(1) The number n of roads each connected from the junction
(2) Angle difference $\theta_0$ between the entering direction and the advance direction for the junction in the clockwise direction
(3) Angle difference $\theta_1$, $\theta_2$ between the entering direction and each direction of other roads except for the advance direction for the junction in the clockwise direction
(4) Angle difference $\theta_L$ between the advance direction and a direction of another road connected from the junction in the counterclockwise direction
(5) Angle difference $\theta_R$ between the advance direction and a direction of another road connected from the junction in the clockwise direction (6) A ratio of road width "P=Wo/Wi" for the road width Wi of entering direction and the road width Wo of advance direction (7) A ratio of road width "Q=max(W1, W2, . . . )/max(Wi, Wo)" for other road width W1, W2, . . . .

In FIG. 7, the angle difference $\theta_1$, $\theta_2$ of above (3) is not shown.

For example, in case of the junction pattern shown in FIG. 6B, the following parameters except for $\theta_1$, $\theta_2$ are obtained.

C(n, $\theta_\theta$, $\theta_L$, $\theta_R$, P, Q)={4, 75, 105, 65, 100, 140}

Next, the road pattern analysis unit 4 compares the above-mentioned parameters with a decision dictionary shown in FIG. 8 in order to decide the road pattern. In the decision dictionary shown in FIG. 8, the number of roads (Hereinafter, it is called connection road) connected to a notice point such as the junction or the corner (In case of the junction, the number is above-mentioned "n"), relation of angle difference between each connection road, road pattern including the junction pattern based on the pedestrian's advance direction, and expression of route guidance representing for the pedestrian how to advance along the road are correspondingly stored. In FIG. 8, "Angle of each road (Angle difference for entering direction)" is angle difference between the entering direction and a direction of each road except for the entering direction, and represented as "$\theta_0$, $\theta_1$, $\theta_2$". For example, if the number of connection roads is two (a road of entering direction and a road of advancing direction), the road pattern is a straight road or a corner. The expression of route guidance is one of "Follow a road", "Right-turn", and "Left-turn" based on angle of the advance direction. On the other hand, if the number of connection roads is three, the road pattern is the junction of forked road. If the number of connection roads is four, the road pattern is the junction of three-forked road. The forked road includes various cases, i.e., a case that each road diverges from the junction point at an interval of almost equal angle, a case that each road diverges at T-crossing (or the end), a case that each road diverges at Y-crossing, and a case that the advance direction is straight but a branch road exists on the way. The case to which the forked Road belongs is decided by combination of the angle difference between the entering direction and each direction of other two connection roads. The expression of route guidance corresponding to the decided case is obtained. As for the three-forked road, based on combination of the angle difference between the entering direction and each direction of other three connection roads, the expression of route guidance is decided as one of "Go straight, and cross the road", "Turn to the right at the junction", "Turn to the left at the junction".

A threshold to decide the angle of each connection route is not limited to values shown in FIG. 8. The threshold may be experimentally determined by making inquiries. In short, some decision standard is determined and stored as a database. The road pattern may be analyzed based on this decision standard.

Figure 9A:
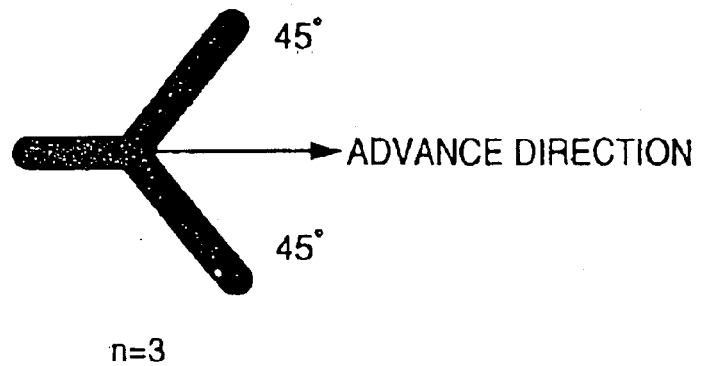
FIGS. 9A and 9B are schematic diagrams of analysis example of the junction pattern.
Figure 9B:
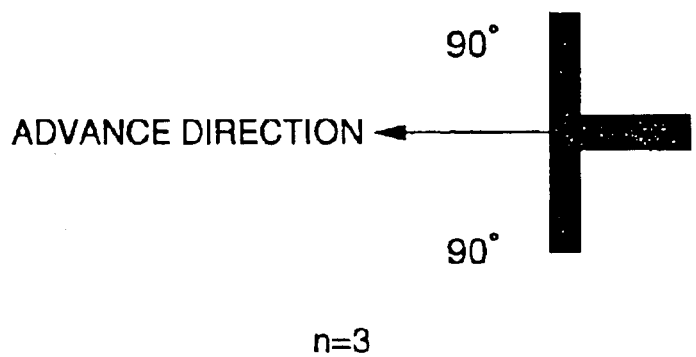

Furthermore, the decision of junction pattern can be executed by angle $\theta_L$, $\theta_R$, shown in FIG. 7. Concretely, suitable threshold is set to the angle $\theta_L$ and $\theta_R$, such as a limit "10°~80°" or a limit "80°~100°". For example, as shown in FIG. 9A, the junction pattern is decided as Y-crossing because of "n=3, $\theta_L=\theta_R=45°$". In the same way, as shown in FIG. 9B, the junction pattern is decided as T-crossing because of "n=3, $\theta_L=\theta_R=90°$".

Figure 10:
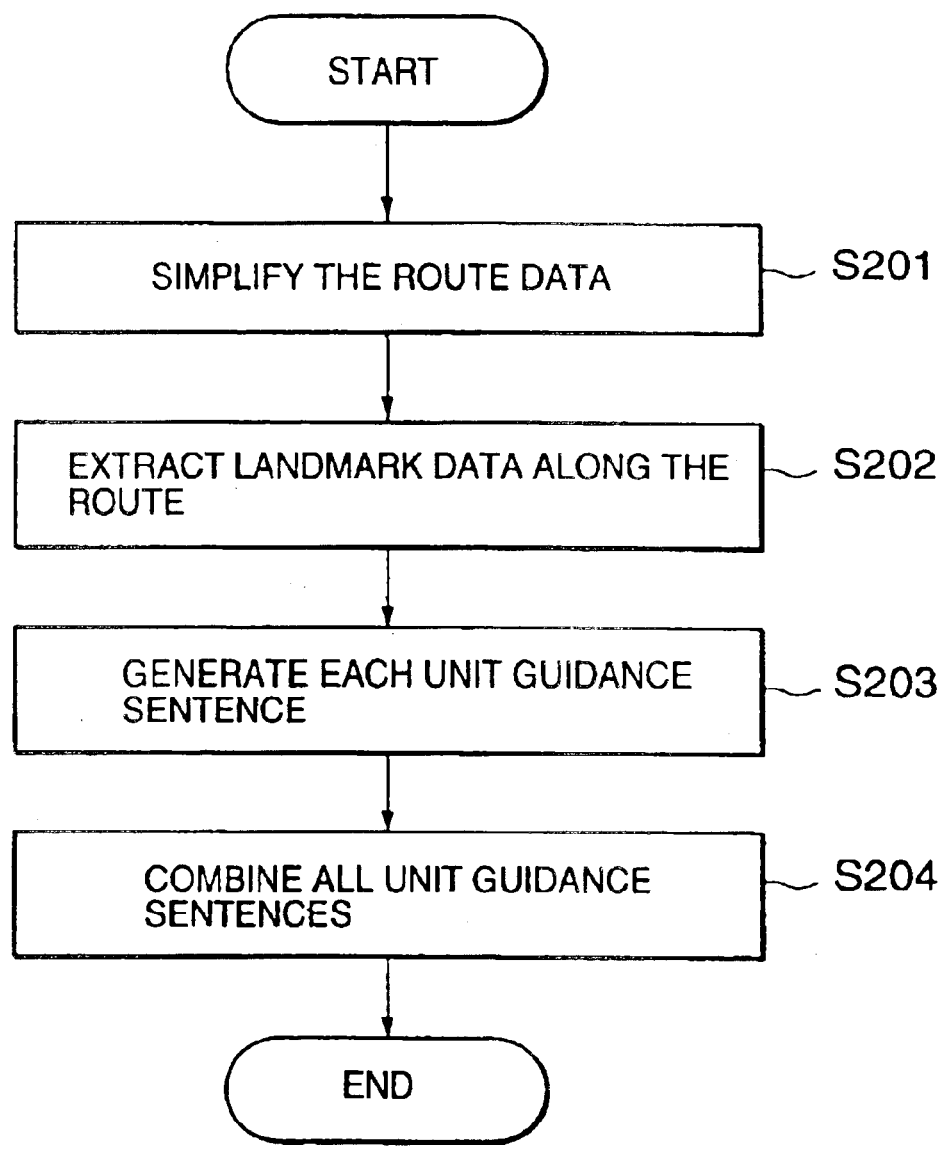
FIG. 10 is a flow chart of generation processing of the route guidance sentence in FIG. 2.
Figure 11:
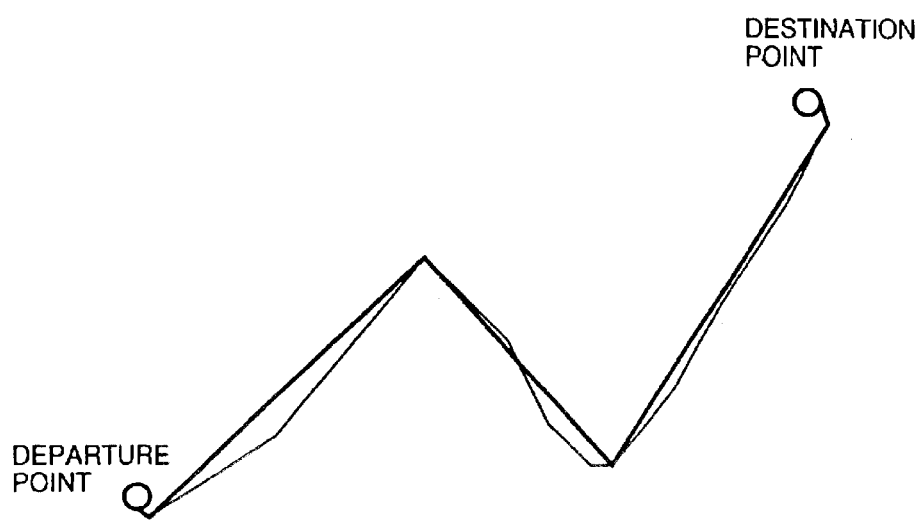
FIG. 11 is a schematic diagram of one example of a simplified route.

Next, by referring to a flow chart shown in FIG. 10, generation processing of the route guidance sentence at S105 by the route guidance sentence generation unit 5 is explained. In case of generation of the route guidance sentence, first, the route search unit 3 executes simplification processing of the route data generated at S102 (S201). The simplification processing consists of deletion of short line and merge processing of continuous lines along the same direction. In the former case, on the junction part of wide road or a part of the road on which a median strip or a viaduct exists, a short line of which the direction is different from a direction of actual road is often included. Accordingly, the short line is deleted in order to maintain continuity of the network. In the latter case, because the route guidance sentence is generated by unit of node, a plurality of lines of the same direction are mutually merged. In short, the merge processing of continuous lines of the same direction is executed for a purpose of reduction of quantity of the route guidance sentence without reduction of information quantity. FIG. 11 shows an example of simplified route of the route shown in FIG. 3. By executing this simplification processing of the route data, generation processing of the route guidance sentence and the simplified map along the route is easily executed.

Next, landmark data of landmarks along the route simplified at S201 is extracted from the database 1 (S202). In the database 1 in FIG. 1, landmark data including items shown in FIG. 12 is stored for each landmark. In FIG. 12, "ID" is a numerical value representing identifier of the landmark. "Name" is a name of the landmark such as a shop name or an institution name. "Class" represents a type of the landmark such as a gas station or a bank. "Priority degree" is numerical value as evaluation standard to decide whether the landmark is preferably used in case of route search or generation of route guidance sentence. "Position" is X, Y coordinate of the landmark (For example, the latitude and the longitude). At step S202, the landmark data of landmark along the simplified route necessary for the route guidance are only extracted from the landmark data of all landmarks stored in the database 1. Next, each unit guidance sentence is generated using the route data simplified at S201, the analysis result obtained at S104 by the route pattern analysis unit 4, and the landmark data extracted at S202 (S203). The unit guidance sentence is a minimum unit to which puts an end as a sentence in case of executing route guidance to the pedestrian. For example, (1) a sentence to guide from the departure place to the first target object, (2) a sentence to guide from a target object to the next target object, (3) a sentence to guide from a corner to the next target object, (4) a sentence to guide from the last target object to the destination, are regarded as the unit guidance sentence. The unit guidance sentence can be generated using a distance between two nodes, the landmark neighboring the node, the junction pattern, and the corner state. Especially, if the target object is the junction, the road pattern analysis unit 4 decides whether the junction pattern is a forked road (T-type, Y-type) or a three-forked road, and how to advance the three-forked road by referring to the decision dictionary shown in FIG. 8. Accordingly, an easy sentence using the junction pattern is generated. Last, each unit guidance sentence generated at S203 is combined along the route (S204). As a result, the route guidance sentence representing the route from the departure place to the destination as a series of sentences is generated.

In the present embodiment, the route guidance sentence is easy for the user to understand in comparison with a route guidance sentence generated based on past techniques. For example, in the route guidance sentence of the prior art, expression such as "Junction point" and "Branch point" are often used. However, in the present embodiment, this expression is changed to "T-crossing" and "Y-crossing" as declared expression of the junction pattern, an expression intuitively easy for the user to understand. Furthermore, in the route guidance sentence of the prior art, an expression such as "Turn to the right, go forward by 10 meters, turn to the left, and go forward by 30 m ters" is often used. However, in the present embodiment, this expression. is changed to "Go forward following a road along by 40 meters." as easy sentence of which the road pattern is briefly represented.

Furthermore, the ratio "P, Q" of road width in the road pattern parameter shown in FIG. 7 may be used for generation of the route guidance sentence by the route guidance sentence generation unit 5. For example, by using information of the ratio of road width, the unit guidance sentence such as "Go forward to a narrow road of the right side by 50 meters at Y-crossing." and "Go straight by 20 meters and turn to the right on a wide road at the end of T-crossing." can be generated. This unit route guidance sentence is easy for the pedestrian to understand.

Figure 13:
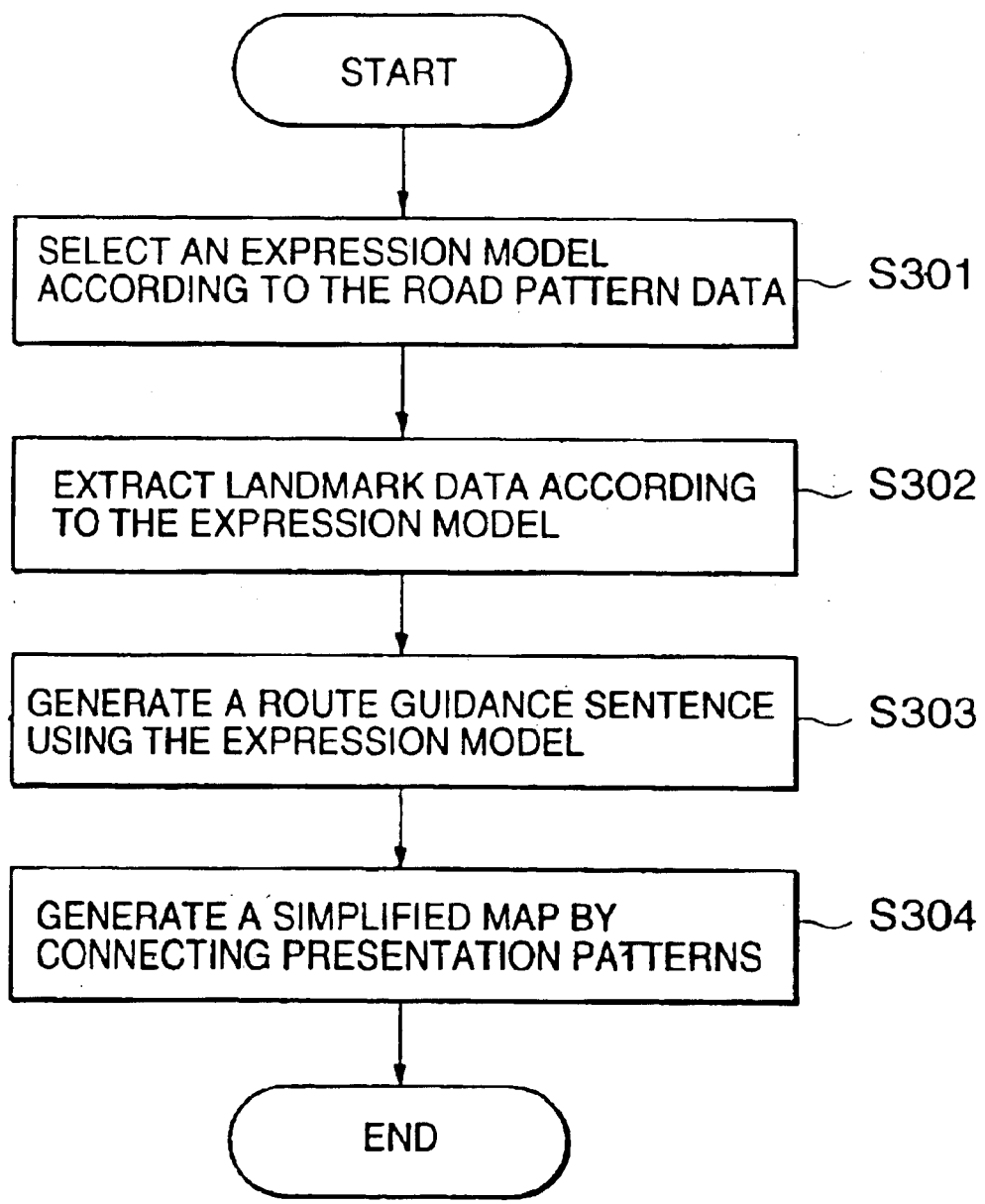
FIG. 13 is a flow chart of one example of generation processing of the simplified map in FIG. 2.
Figure 14A:
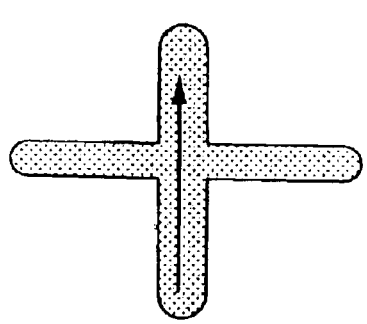
FIGS. 14A, 14B, 14C, and 14D are schematic diagrams of various examples of presentation patterns as bit map data.
Figure 14B:
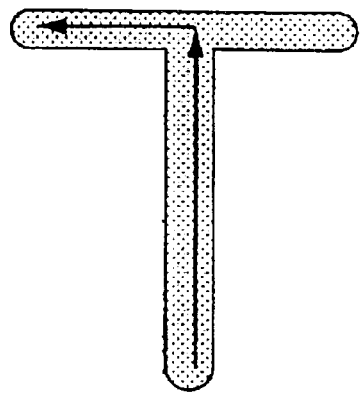
Figure 14C:
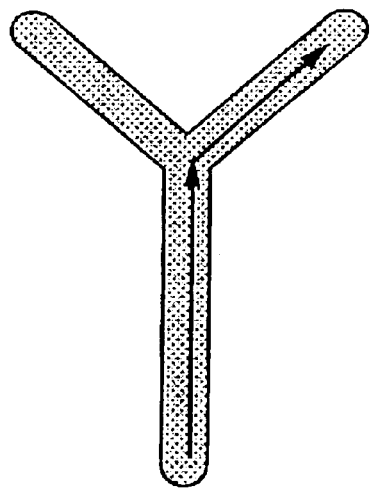
Figure 14D:

Next, by referring to a flow chart shown in FIG. 13, generation processing of the simplified map at step S106 by the simplified map generation unit 6 is explained. In the database 1, as shown in FIGS. 14A, 14B, 14C, and 14D, a plurality of presentation patterns corresponding to various road pattern data obtained by the road pattern analysis unit 4 are previously stored in order to generate the simplified map. The presentation patterns shown in FIGS. 14A, 14B, 14C, and 14D are registered as bit map data in the simplified map database of the database 1, and used for representation of the simplified map. In case of generating the simplified map, first, an expression model corresponding to the road pattern data generated by the road pattern analysis unit 4 is selected from the database (S301). For example, assume that the analyzed road pattern is the junction pattern represented by the following parameter shown in FIG. 7.

$C(n, \theta_0, \theta_L, \theta_R, P, Q) = \{4, 75, 105, 65, 100, 140\}$

In the database 1, the following four expression models corresponding to above parameters are registered.

① TURN TO <TURN> AT <CROSS>.
② TURN TO <TURN> AT THE CORNER OF <MARK>.
③ TURN TO <TURN> AT THIS SIDE OF <MARK>.
④ TURN TO <TURN> AT A CROSSROADS DISTANT BY <DIST> METER FROM <MARK>.

In the above expression models, a junction name is assigned to <CROSS>, a landmark name is assigned to <MARK>, turn direction (the left or the right) is assigned to <TURN>, and a distance to the junction is assigned to <DIST>.

Figure 15:
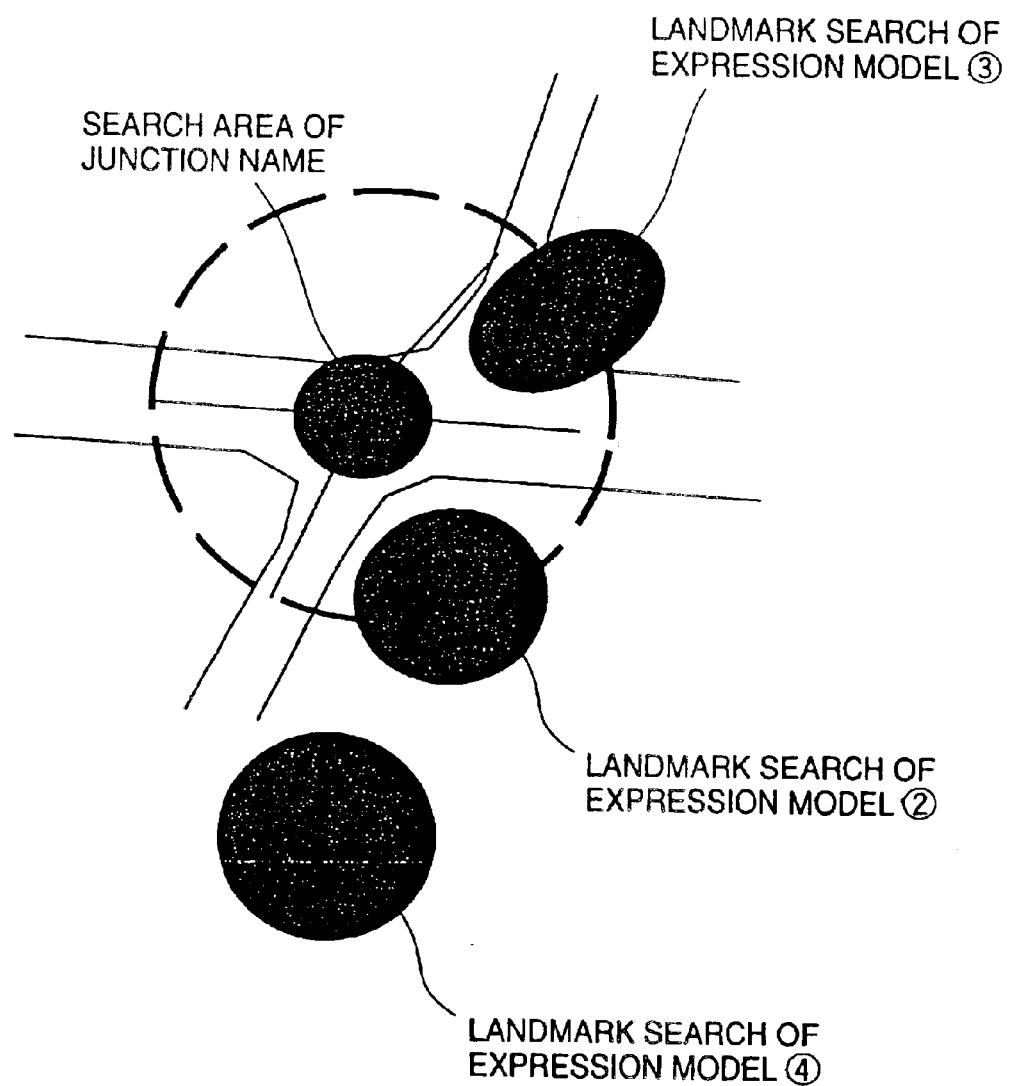
FIG. 15 is a schematic diagram of various examples of a landmark search area neighboring a junction point.

Next, the landmark data corresponding to the expression model selected at S301 is extracted from the database 1 (S302). For example, in case of the junction pattern shown in FIG. 6, each landmark search area corresponding to the selected expression model is set around the junction as shown in FIG. 15, and landmark data is extracted from each landmark search area. After the landmark data is extracted at S302, the landmark name, the junction name, the distance from the junction, and the turn direction are assigned to the expression model selected at S301, and the route guidance sentence is generated (S303). Last, a plurality of presentation patterns are selected based on the route pattern (junction, corner, and so on) and connected along the guidance route.

In this case, the route pattern for selecting the presentation pattern is determined by the expression of route guidance in the decision dictionary shown in FIG. 8. As a result, a simplified map from the departure point to the destination point is generated in correspondence with the route guidance sentence generated at S303 (S304).

Figure 17:
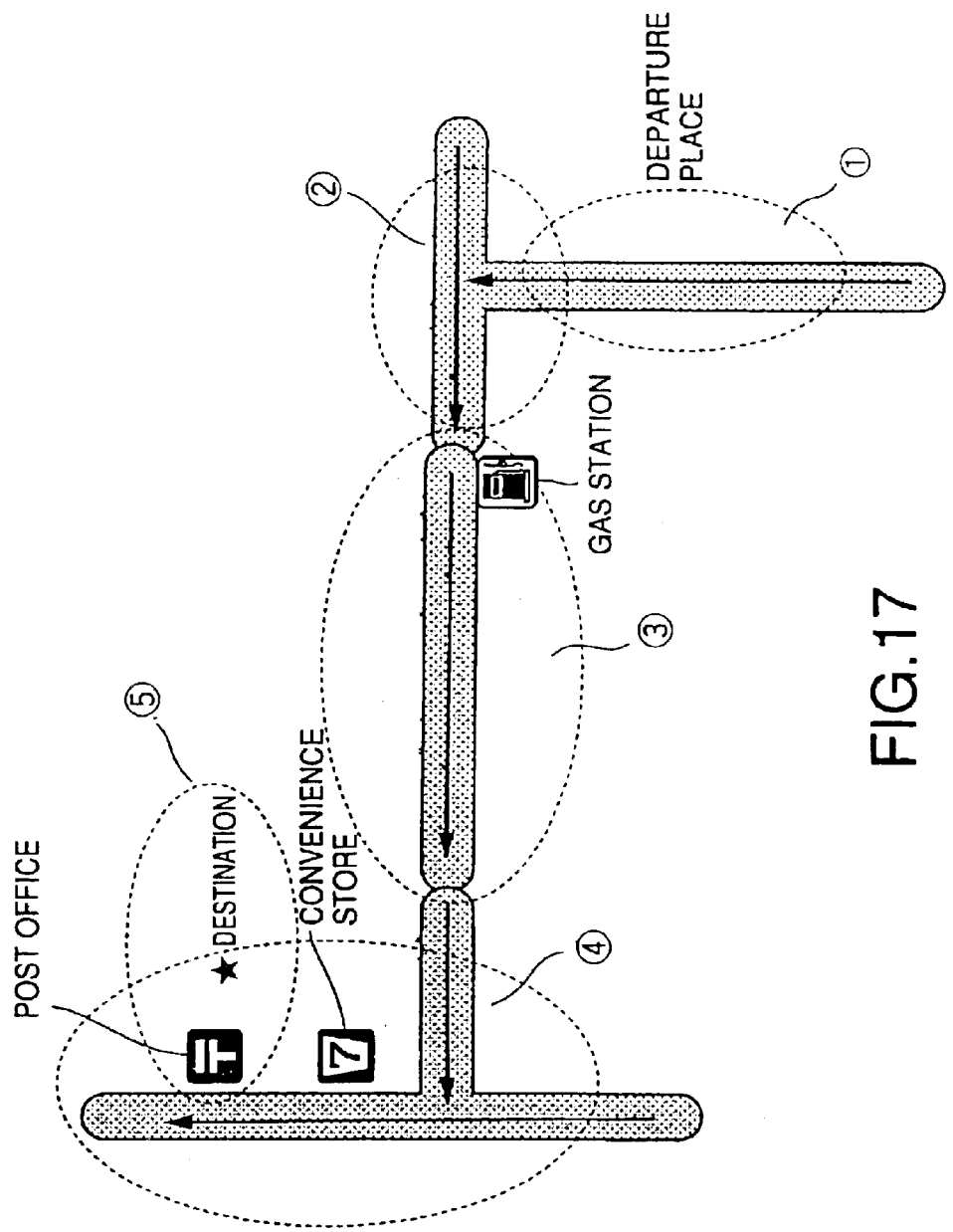
FIG. 17 is a schematic diagram of one example of simplified map as bit map format.

FIG. 16 shows an example of the route guidance sentence generated at S303. FIG. 17 shows an example of the simplified map generated at S304. In FIG. 17, by combining the presentation pattern shown in FIGS. 14A, 14B, 14C, and 14D, the simplified map of bit map format is represented as the guidance route.

In this way, a plurality of presentation patterns of bit map data corresponding to various road pattern generated by the road pattern analysis unit 4 are previously registered in the database 1. The presentation patterns corresponding to the road pattern data actually obtained by the road pattern analysis unit 4 are combined, and the simplified map along the guidance route is easily generated.

The presentation pattern shown in FIGS. 14A, 14B, 14C, and 14D may be registered as text data in the route guidance sentence database of the database 1. In this case, the text data corresponding to the road pattern data obtained by the road pattern analysis unit 4 are extracted from the route guidance sentence database, and the route guidance sentence is generated.

Figure 18:
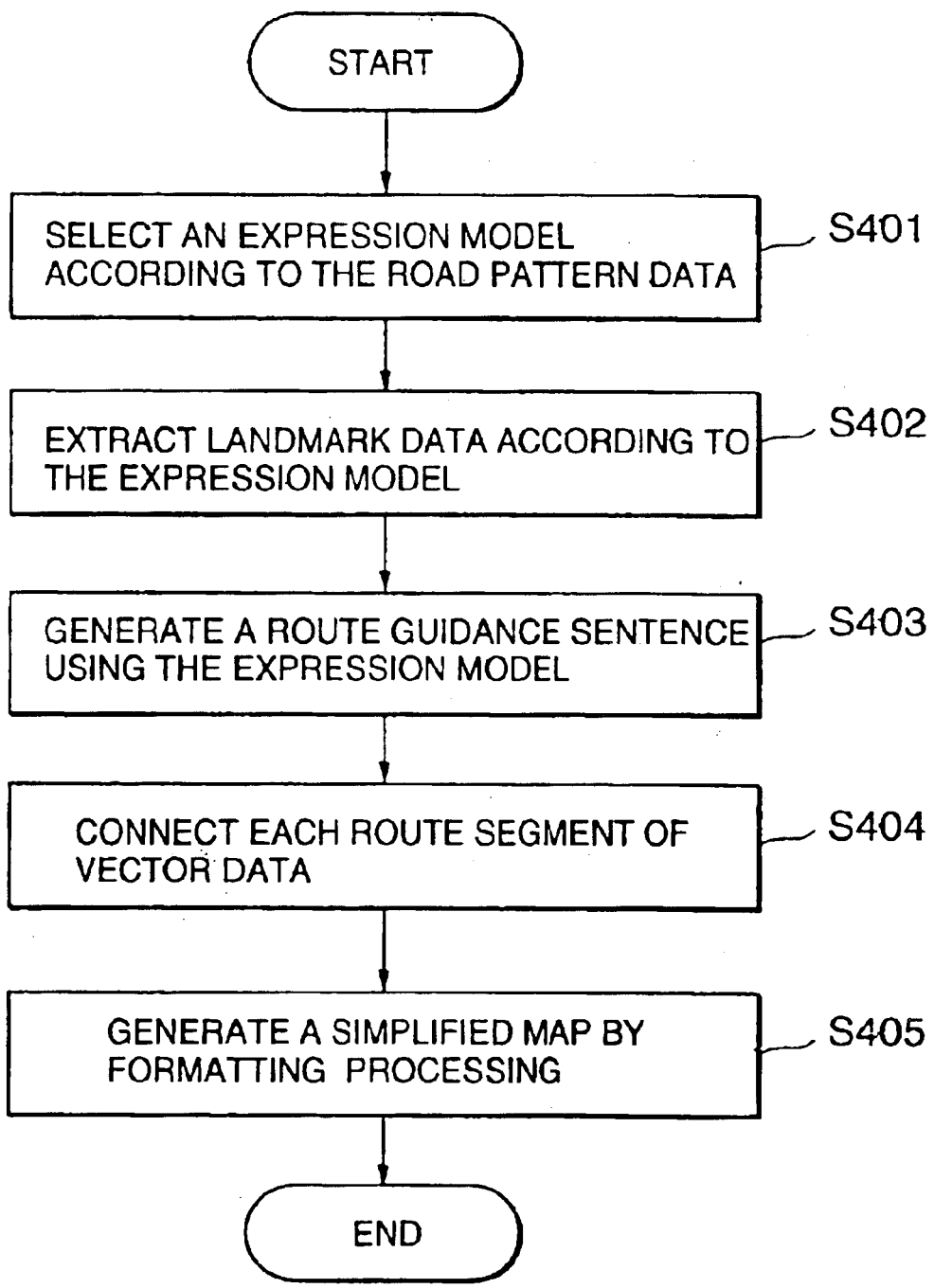
FIG. 18 is a flow chart of another example of generation processing of simplified map in FIG. 2.
Figure 19A:
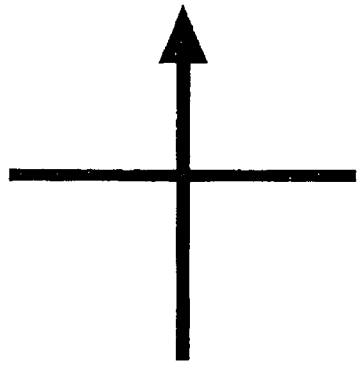
FIGS. 19A, 19B, 19C, and 19D are schematic diagrams of various examples of presentation pattern as vector data.
Figure 19B:
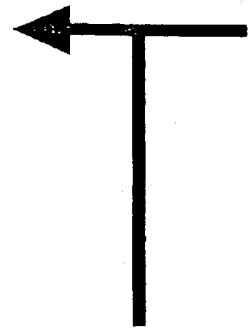
Figure 19C:
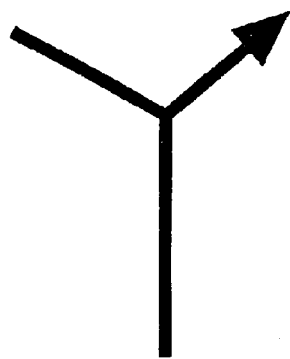
Figure 19D:

FIG. 18 shows a flow chart of another example of simplified map generation processing at S106 by the simplified map generation unit 6. In this example, as shown in FIGS. 19A, 19B, 19C, and 19D, a plurality of presentation patterns corresponding to various road pattern data obtained by the road pattern analysis unit 4 are previously stored in order to generate the simplified map. The presentation patterns shown in FIGS. 19A, 19B, 19C, and 19D are registered as vector data in the simplified map database of the database 1, and used for representation of the simplified map. In case of generating the simplified map, as mentioned-above, the expression model corresponding to the road pattern data generated by the road pattern analysis unit 4 is selected from the database (S401).

Next, the landmark data corresponding to the expression model selected at S401 is extracted from the database 1 (S402). For example., in case of the junction pattern shown in FIG. 6, each landmark search area corresponding to the selected expression model is set around the junction as shown in FIG. 15, and the landmark data are extracted from each landmark search area. After the landmark data are extracted at S402, the landmark name, the junction name, the distance from the junction and the turn direction, are assigned to the expression model selected at S401, and the route guidance sentence is generated (S403).

Figure 20:
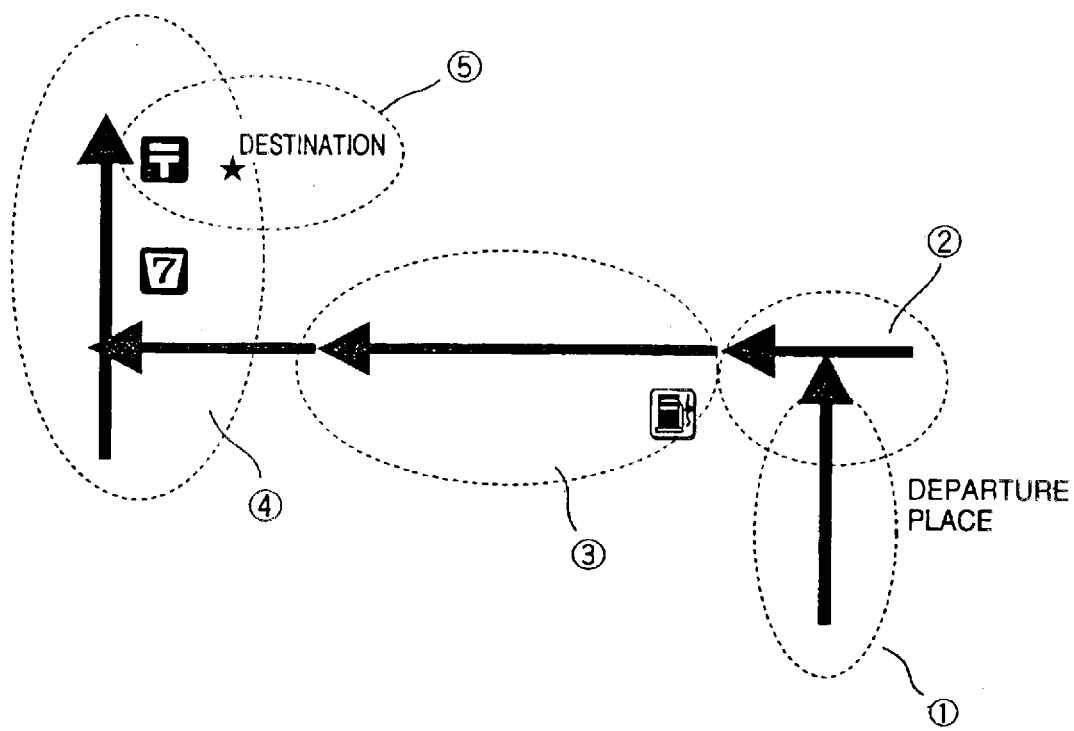
FIG. 20 is a schematic diagram of one example of the simplified map as vector format before formatting processing.
Figure 21:
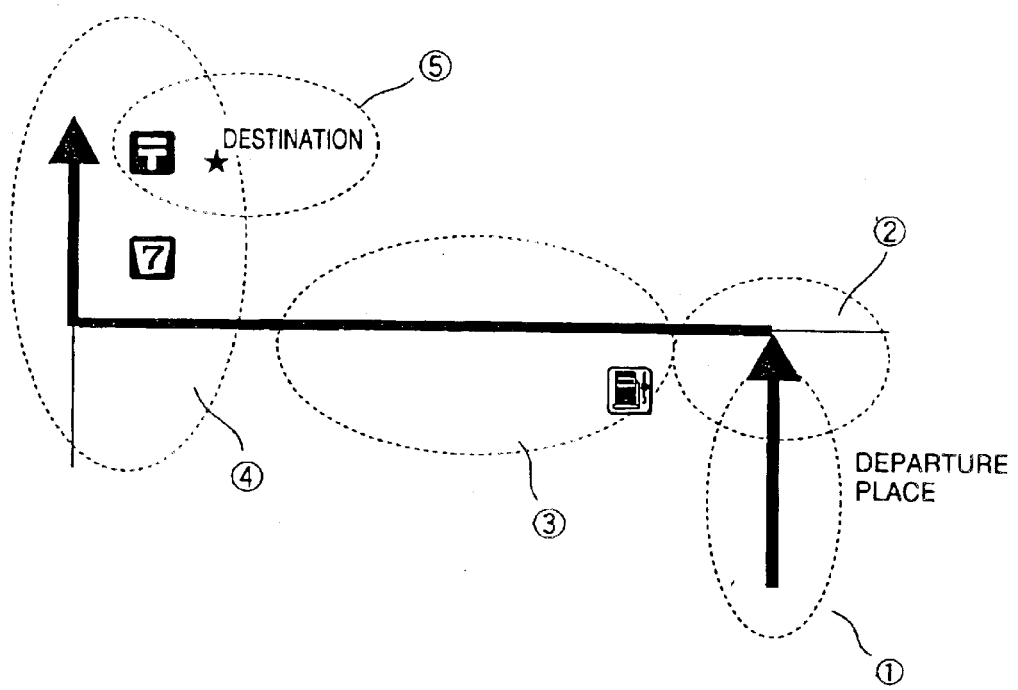
FIG. 21 is a schematic diagram of one example of the simplified map as vector format after formatting processing.

Next, a plurality of presentation patterns of vector data are selected based on the route pattern (junction, corner, and so on) and connected along the guidance rout (S404). In this case, the route pattern for selecting the presentation pattern is determined by the expression of route guidance in the decision dictionary shown in FIG. 8. Then, by executing formatting processing, the simplified map from the departure point to the destination point along the guidance route is generated (S405). FIG. 20 shows an example of the simplified map obtained at S404. In FIG. 20, the simplified map includes many arrows and unnecessary lines because five vector data are connected as themselves. On the other hand, FIG. 21 shows an example of the simplified map of FIG. 20 for which formatting processing is executed at S405. In FIG. 21, the arrow of passing point on the route is eliminated from the simplified map. In other words, only an arrow at the end of the vector at a key point (For example, the departure point, the destination point, the corner) is preserved in the simplified map. In addition to this, unnecessary lines are eliminated from the simplified map. By eliminating unnecessary arrows and lines, the simplified map is easy for the user to understand.

In this way, a plurality of presentation patterns of vector data corresponding to various road patterns generated by the road pattern analysis unit 4 are previously registered in the database 1. The presentation patterns corresponding to the road pattern data actually obtained by the road pattern analysis unit 4 are combined, and the simplified map along the guidance route is easily generated. In this case, in comparison with the bit map data shown in FIGS. 14A, 14B, 14C, and 14D, the presentation pattern is stored as the vector data of reduced data quantity in the database 1. Accordingly, load of the database 1 is reduced, processing quantity of, the route guidance apparatus is reduced, and high speed processing can be executed. Furthermore, in case of using the vector data, as mentioned-above, formatting processing for eliminating unnecessary information from the simplified map is easily executed. Especially, even if a portable communication terminal having a small sized-display executes the route guidance, the simplified map easy to see can be presented to the user.

Figure 22:
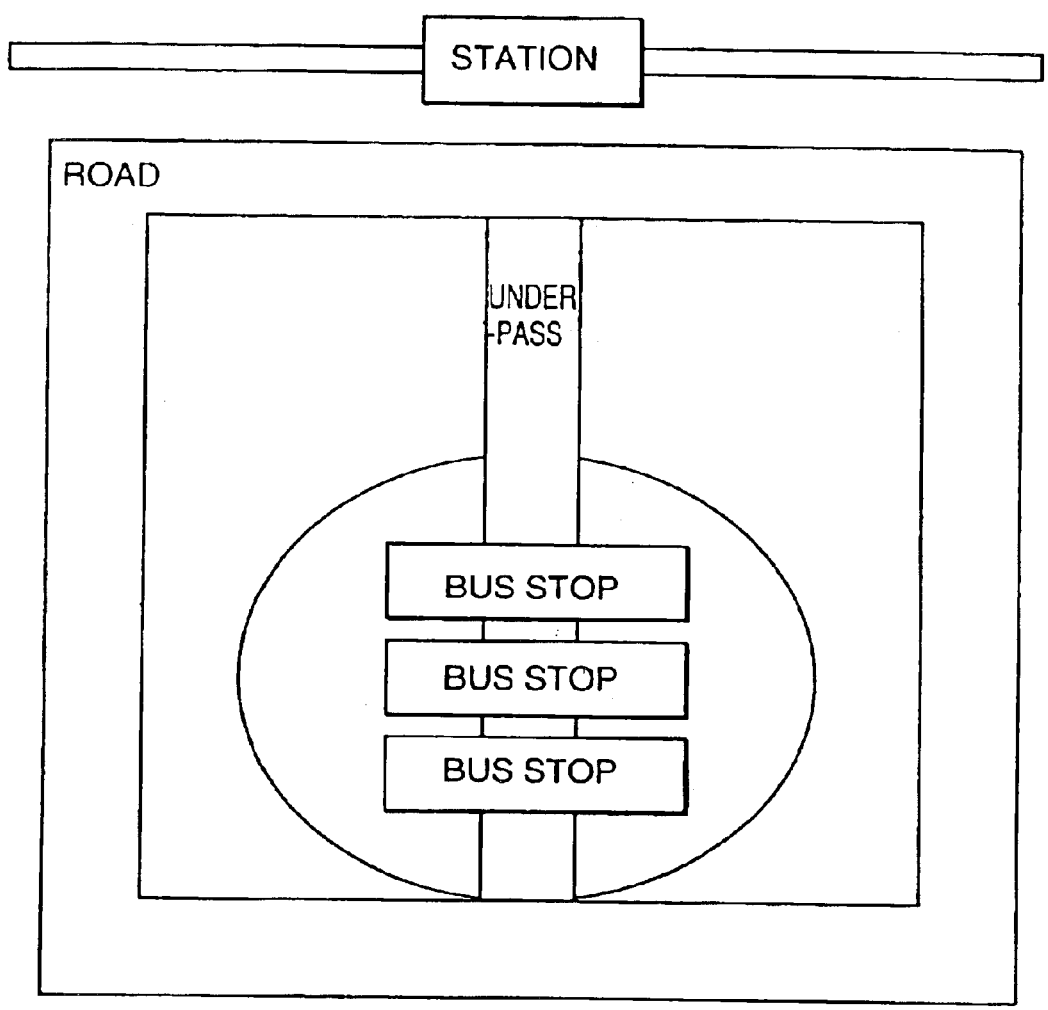
FIG. 22 is a schematic diagram of one example of arrangement of a station rotary.
Figure 23:
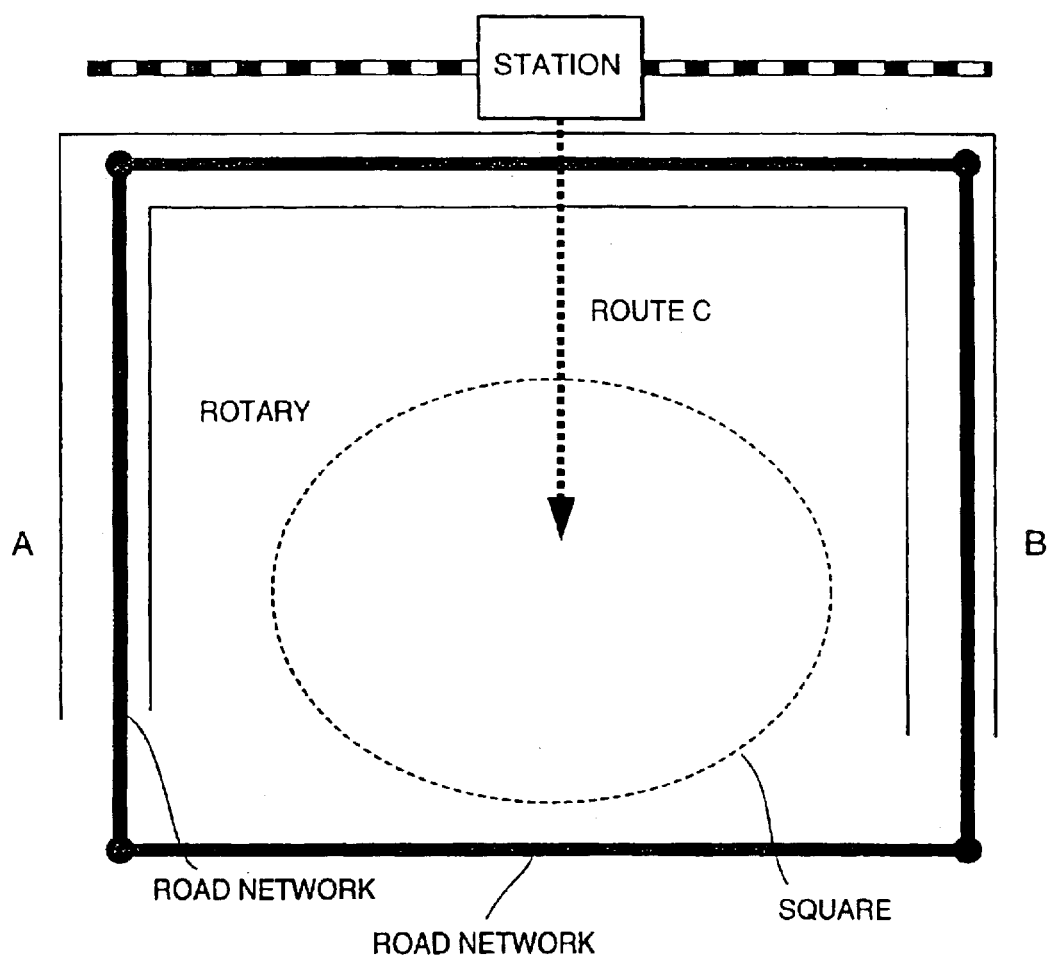
FIG. 23 is a schematic diagram of one example of road network in the station rotary of FIG. 22.

In the above explanation, the case of executing the route guidance by analyzing the junction pattern is mainly described. However, by analyzing another road pattern such as a station rotary, the analysis result can be also reflected in the route guidance. FIG. 22 shows one example of arrangement of a typical rotary in front of a station. Assume that the route guidance is presented when a pedestrian changes from a train to a bus at the station. FIG. 23 shows one example of the road network of the rotary shown in FIG. 22. In order to change from a train to a bus in the rotary, the pedestrian should not walk a route A or a route B as a ground road around the rotary, but should go to a bus stop through a route C as an underpass. If the underpass does not exist, the pedestrian may go to the bus stop through a marked crosswalk. In this way, in unique road pattern different from general road including a junction, even if component of the road network is analyzed, sufficient route guidance is impossible. Briefly, if normal road such as a roadway or a neighboring sidewalk does not exist, an area for the pedestrian to walk should be decided.

In FIG. 23, four routes existing in front of the station form a closed loop, and a square exists in the closed loop. The square surrounded by the four routes is often regarded as a departure and arrival place of the bus or a parking lot. Accordingly, this square is decided as a station rotary.

In this way, as for the rotary, the road pattern analysis unit 4 can analyze where the area for the pedestrian to walk is according to relation among the station, the road network and the square. Furthermore, in case of generating the road network data previously, network data such as the underpass crossing the square are generated. In this case, the route search unit 3 can search for the route without deciding whether a square exists.

As mentioned-above, in the present invention, the road pattern such as the junction on the route from the departure place to the destination is macroscopically analyzed, and the analysis result is reflected in the route guidance information. As a result, useless or diffuse expression in the route guidance information can be removed. Accordingly, the route guidance information easy to intuitively understand is generated and presented to the user.

A memory can be used to store instructions for performing the process described above. Such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A pedestrian route guidance apparatus, comprising:

a database configured to store map data including road network data and landmark data;

a route search unit configured to search for a route from a departure point to a destination point from the road network data stored in said database, and to divide the route into a departure area, a destination area, and an intermediate area, wherein the departure area is a route area from the departure point to a first target point, the destination area is a route area from a last target point to the destination point, and the intermediate area is a junction area excluding the departure area and the destination area from the route;

a road pattern analysis unit configured to set a mask having a size several times a road width of advance direction of the junction area, to extract the road network data corresponding to the mask from said database as a route network extraction area, to analyze a road pattern of the route by referring to the road network data, and to obtain road pattern data as the analysis result;

a route guidance information generation unit configured to generate route guidance information of the route using the road pattern data and the landmark data along the route; and a presentation unit configured to present the route guidance information by speech.

2. A pedestrian route guidance method, comprising:

storing map data including road network data and landmark data in a database;

searching for a route from a departure point to a destination point from the road network data stored in said database;

dividing the route into a departure area, a destination area, and an intermediate area, wherein the departure area is a route area from the departure point to a first target point, the destination area is a route area from a last target point to the destination point, and the intermediate area is a junction area excluding the departure area and the destination area from the route;

setting a mask having a size several times a road width of advance direction of the junction area;

extracting the road network data corresponding to the mask from said database as a route network extraction area;

analyzing a road pattern of the route by referring to the road network data;

obtaining road pattern data as the analysis result;

generating route guidance information of the route using the road pattern data and the landmark data along the route; and presenting the route guidance information by speech.

3. A computer program product, comprising:

a computer-readable program code embodied in said product for causing a computer to execute pedestrian route guidance, said computer-readable program code having:

a first program code to store map data including road network data and landmark data in a database;

a second program code to search for a route from a departure point to a destination point from the road network data stored in said database;

a third program code to divide the route into a departure area, a destination area, and an intermediate area, wherein the departure area is a route area from the departure point to a first target point, the destination area is a route area from a last target point to the destination point, and the intermediate area is a junction area excluding the departure area and the destination area from the route;

a fourth program code to set a mask having a size several times a road width of advance direction of the junction area;

a fifth program code to extract the road network data corresponding to the mask from said database as a route network extraction area;

a sixth program code to analyze a road pattern of the route by referring to the road network data;

a seventh program code to obtain road pattern data as the analysis result;

an eighth program code to generate route guidance information of the route using the road pattern data and the landmark data along the route; and a ninth program code to present the route guidance information by speech.

* * * * *